US009650931B2

(12) United States Patent
Kast

(10) Patent No.: US 9,650,931 B2
(45) Date of Patent: May 16, 2017

(54) EXHAUST GAS TREATMENT DEVICE AND CORRESPONDING METHOD FOR MANUFACTURING SAME

(71) Applicant: Eberspächer Exhaust Technology GmbH & Co. KG, Neunkirchen (DE)

(72) Inventor: Peter Kast, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 8 days.

(21) Appl. No.: 14/631,271

(22) Filed: Feb. 25, 2015

(65) Prior Publication Data

US 2015/0240684 A1 Aug. 27, 2015

(30) Foreign Application Priority Data

Feb. 26, 2014 (DE) .......................... 10 2014 203 495

(51) Int. Cl.
| | |
|---|---|
| *F01N 3/00* | (2006.01) |
| *F01N 3/20* | (2006.01) |
| *B23K 31/02* | (2006.01) |
| *F01N 3/18* | (2006.01) |
| *F01N 3/28* | (2006.01) |
| *F01N 13/00* | (2010.01) |

(52) U.S. Cl.
CPC ............... *F01N 3/20* (2013.01); *B23K 31/02* (2013.01); *F01N 3/18* (2013.01); *F01N 3/2828* (2013.01); *F01N 3/2853* (2013.01); *F01N 3/2867* (2013.01); *F01N 13/0097* (2014.06); *F01N 2450/02* (2013.01)

(58) Field of Classification Search
USPC ......... 60/272, 274, 282, 298, 299, 300, 320; 422/179, 180, 221; 29/401.1, 890
See application file for complete search history.

(56) References Cited

U.S. PATENT DOCUMENTS

| | | | | |
|---|---|---|---|---|
| 3,876,384 | A | * 4/1975 | Santiago | ............... F01N 3/2853 138/108 |
| 4,143,117 | A | * 3/1979 | Gaysert | ................. F01N 3/2867 138/112 |
| 4,347,219 | A | 8/1982 | Noritake et al. | |
| 4,581,206 | A | 4/1986 | Otani et al. | |

(Continued)

FOREIGN PATENT DOCUMENTS

| | | |
|---|---|---|
| DE | 22 61 663 A | 6/1974 |
| DE | 10 2008 016 236 A1 | 10/2009 |

(Continued)

*Primary Examiner* — Binh Q Tran
(74) *Attorney, Agent, or Firm* — McGlew and Tuttle, P.C.

(57) ABSTRACT

A method for manufacturing an exhaust gas treatment device (1), which has at least one ceramic substrate body (3, 4) for exhaust gas treatment in a tubular housing (2), includes inserting the substrate body (3) axially into the housing (2). An axial support (13), which has a supporting ring (14) and a ring-shaped support element (15) held by the supporting ring (14), is inserted axially into the housing (2) and is positioned therein such that the axial support (13) transmits a predetermined axial force (28) to the substrate body (3) via the support element (15). The axial support (13) is fixed to the housing (2) with the axially prestressed (predetermined axial force) positioning, in which the supporting ring (14) is welded to the housing (2).

20 Claims, 2 Drawing Sheets

(56) References Cited

U.S. PATENT DOCUMENTS

| | | | |
|---|---|---|---|
| 5,068,637 A | 11/1991 | Bayer | |
| 5,555,621 A | 9/1996 | Tanabe et al. | |
| 8,454,898 B2 * | 6/2013 | Wirth | F01N 3/0211 422/179 |
| 2007/0011874 A1 * | 1/2007 | Myers | B01D 46/10 29/890 |
| 2008/0241007 A1 * | 10/2008 | Hardesty | F01N 3/0211 422/179 |
| 2009/0241512 A1 | 10/2009 | Wirth | |
| 2011/0278265 A1 | 11/2011 | Kessler et al. | |

FOREIGN PATENT DOCUMENTS

| | | |
|---|---|---|
| EP | 2 101 046 A2 | 9/2009 |
| FR | 2 244 909 A1 | 4/1975 |
| GB | 1484933 A | 9/1977 |
| JP | 59-215914 A | 12/1984 |
| JP | 63-90612 A | 4/1988 |
| JP | 2-126016 U | 10/1990 |
| JP | 6-264734 A | 9/1994 |
| JP | 6-73322 U | 10/1994 |
| JP | H06 280551 A | 10/1994 |

* cited by examiner

EXHAUST GAS TREATMENT DEVICE AND CORRESPONDING METHOD FOR MANUFACTURING SAME

CROSS REFERENCE TO RELATED APPLICATIONS

This application claims the benefit of priority under 35 U.S.C. §119 of German Patent Application DE 10 2014 203 495.7 filed Feb. 26, 2014, the entire contents of which are incorporated herein by reference.

FIELD OF THE INVENTION

The present invention pertains to a method for manufacturing an exhaust gas treatment device. In addition, the present invention pertains to an exhaust gas treatment device manufactured according to this method.

BACKGROUND OF THE INVENTION

Exhaust gas treatment device frequently operate with ceramic substrate bodies, for example, catalytic converters and particle filters. Depending on the purification task, the substrate bodies in catalytic converters may have a catalytically active coating in order to form an oxidation catalytic converter or a DeNox catalytic converter or a three-way catalytic converter or a hydrolytic catalytic converter or an ammonia-blocking catalytic converter. The substrate bodies are usually manufactured from a piece consisting of a uniform material, i.e., monolithically, so that they form a monolith each. Depending on the purification task, flow is also possible through two or more ceramic substrate bodies. Furthermore, it may be possible, to increase efficiency, to arrange two or more substrate bodies one after another. Two or more substrate bodies, which differ from one another, for example, by different pore sizes, may also be arranged one after another in a particle filter. Substrate bodies having different purification tasks, i.e., especially with different catalytic coatings, may also be arranged in a common housing.

To achieve a compact design, such an exhaust gas treatment device may have a tubular housing, in which either exactly one ceramic substrate body is arranged for exhaust gas treatment, or at least two ceramic substrate bodies are arranged one after another for the exhaust gas treatment. Such ceramic substrate bodies are usually mounted in a metallic housing by means of mounting mats. The mounting mats are compressed radially in this case. The insertion of the substrate bodies with mounting mat into the housing is usually called "canning." Axial canning, in which the respective substrate body is inserted with the mounting mat axially into the tubular housing, is of interest here.

To secure the axial position of the substrate body within the housing, it is possible, in principle, to provide an axial support at the housing, at which support the respective substrate body can be axially supported. Such an axial support is preferably arranged on the outlet side or discharge side of the respective substrate body. If at least two substrate bodies are arranged one after another in the housing in an exhaust gas treatment device, it is desirable to support the substrate body arranged upstream at the housing by means of such an axial support in order to prevent an axial displacement of the substrate through which the exhaust gas flows first, because such displacement may lead to a collision with the substrate body arranged downstream and thus to a risk of damage to both substrates. This makes it difficult to mount or manufacture the exhaust gas treatment device. For example, the substrate body located upstream must be inserted into the housing from the inlet side of the housing in a housing that contains such an axial support, while the substrate body located downstream must be inserted into the housing through an outlet side of said housing in order for the axial support to be subsequently arranged axially between the two substrate bodies. Depending on the canning method, the housing must be turned in a corresponding canning device for this. An axial support is likewise desirable for protection from a collision of the substrate body with the housing in an exhaust gas treatment device that contains only a single substrate body, in connection with which similar problems arise during manufacture.

SUMMARY OF THE INVENTION

An object of the present invention is to provide an improved or at least different embodiment, which is characterized especially by a reduced risk of damage to the respective substrate body as well as optionally by simplified manufacture, for such an exhaust gas treatment device and for a corresponding manufacturing method.

The present invention is based on the general idea of carrying out the canning by inserting first a substrate body with a mounting mat into the housing, subsequently inserting an axial support into the housing and positioning same in a predetermined manner for axially supporting the first substrate body in the housing, and by finally fixing the axial support on the housing in the desired position and with a desired axial prestress between the substrate body and the axial support. The axial positioning of the substrate body in its predetermined relative position in the housing is improved hereby and the risk of displacement of the substrate body during the operation of the exhaust gas treatment device is reduced. Since even such an axial displacement between the substrate body and the housing runs the risk of damage to the substrate body, this prestressed positioning and fixation can reduce the risk of damage to the substrate body.

Provisions may optionally be made in an embodiment in which at least two substrate bodies are provided for inserting a second substrate body with a second mounting mat into the housing after the insertion of a first substrate body with a first mounting mat and after inserting, positioning and fixing the axial support, such that the axial support will subsequently be arranged between the first substrate body and the second substrate body. It is possible, due to this mode of construction, in particular, to insert the above-mentioned three components, namely, the two substrate bodies and the axial support, through the same axial opening of the housing, so that it is possible to avoid, in particular, a turning of the housing during the canning process.

Further, provisions may optionally be made for also providing such an axial securing device, which is positioned and fixed at the housing under the respective desired prestress, for the second substrate body and especially also for every additional substrate body. The setting of different axial prestresses is conceivable in case of different substrate bodies.

The respective axial securing device is preferably formed by means of a supporting ring and a ring-shaped support element being held by the supporting ring. The axial support may be preferably positioned in the housing such that it transmits a predetermined axial force via the support element to the first substrate body inserted into the housing before. For example, the axial force occurring when the axial support is pressed against the first substrate body can be measured for this during the insertion of the axial support and set to a predetermined value. Especially advantageous is now a variant of the method, in which the axial support is fixed to the housing during this axially prestressed positioning. For example, the supporting ring may be welded for this to the housing. The set and predetermined axial force between the axial support and the first substrate body can quasi freeze due to this measure. Axially prestressed mounting of the first substrate body on the axial support is achieved hereby, even though the axial support is inserted into the housing after the first substrate body only. Axially prestressed mounting is advantageous, because the risk of an axial displacement of the substrate located upstream is reduced thereby.

The canning device necessary for this thus comprises a positioning device, by means of which the axial support can be inserted into the housing and supported at the first substrate with the predetermined axial force. The positioning device may be equipped for this with an axial force-measuring device. Further, this positioning device is preferably designed such that it can position the axial support with the desired prestress relative to the housing during the corresponding welding operation as well.

Corresponding to an advantageous variant of the method, the supporting ring may be pressed radially against the housing prior to welding and welded to the housing in this pressed-on state. The supporting ring is fixed at the housing in the radial direction quasi without clearance and gap due to this measure, as a result of which an especially efficient and durable welded connection can be prepared. The corresponding positioning device is designed in this case especially to widen the supporting ring, so that it can press the supporting ring radially against the housing for the welding operation.

According to one variant, the supporting ring may have an interruption in the circumferential direction, so that it is elastically deformable in terms of its diameter for the radial pressing against the housing. The supporting ring, which has one interruption in the circumferential direction, simplifies the radial pressing of the supporting ring onto the housing. While the supporting ring is interrupted in the circumferential direction, the support element may be designed such that it is closed or free from interruptions in the circumferential direction. The support element has a certain axial elasticity for the axial support of the first substrate body. The axial elasticity may be associated with a sufficient elasticity in the circumferential direction, so that the support element can readily follow elastically the widening of the supporting ring.

According to another embodiment, the supporting ring may have a holding area holding the support element and a fixing area provided for welding to the housing. The fixing area preferably projects axially over the holding area and the support element. When positioning the axial support in the housing, the fixing area is inserted into a radial gap, which is formed radially between the housing and the first substrate body, and the fixing area is welded to the housing in this radial gap. The respective welded connection is axially offset as a result in relation to the support element. Lever arms, which reduce a bending load of the respective welded connection during the transmission of axial force, develop within the axial support due to this measure, so that the respective welded connection must transmit essentially only shearing forces, i.e., tensile forces directed in parallel to the longitudinal axis of the housing. As a result, the respective welded connection will have an especially long service life.

Corresponding to one advantageous variant, an axial edge of the first mounting mat facing the axial support may be arranged axially offset in relation to an axial end face of the first substrate body, which said end face faces the axial support, so that said edge of the first mounting mat axially limits the radial gap, with which the aforementioned fixing area meshes axially. The fixing area of the supporting ring can be inserted into the radial gap without damage to the mounting mat due to this axial offset between the first mounting mat and the first substrate body.

In another embodiment, the welding for fixing the axial support to the housing may be carried out from an outer side of the housing, radially through the housing. Manufacture is simplified hereby, because the axial support can be positioned in the desired manner on an inner side of the housing by means of the aforementioned positioning device, while the fixation of the axial support on the outer side is carried out by means of a corresponding welding device.

For example, the welding of the axial support to the housing may be carried out as laser sweep welding. A spot welding method may also be used as an alternative. Discrete weld seams, i.e., weld seams limited in their longitudinal direction, are produced by means of the laser welding technique in laser sweep welding. The longitudinal direction of the weld seams preferably extends in the circumferential direction of the housing. A plurality of weld seams distributed in the circumferential direction and located at spaced locations from one another are thus correspondingly generated in order to fix the axial support to the housing.

Corresponding to an advantageous variant, the housing may be nonperforated in the area of the axial support and welded to the supporting ring in the nonperforated state. Fixation of the support to the housing is simplified hereby, because no openings need to be prepared in the housing in advance in order to produce, for example, the welds. The welding is carried out through the housing and through the material of the housing.

A wire mesh, which is elastically deformed during the axial prestressing of the axial support, may be used as the support element according to another advantageous embodiment. Such a wire mesh is characterized by durable elasticity even at high temperatures.

According to another advantageous embodiment, the supporting ring may be provided with a U-shaped section, which has an outer leg and an inner leg for radially positioning the support element as well as a base connecting the outer leg with the inner leg for axially positioning the support element. A cross section of the supporting ring, which cross section has the U-shaped section, is located in a section plane containing the central longitudinal axis. The U-shaped section extends in the circumferential direction of the supporting ring. The support element is positioned securely at the supporting ring by the U-shaped section.

Preferred is an embodiment in which the outer leg axially projects over the inner leg and preferably also over the support element and is welded to the housing. In particular, the outer leg now forms the aforementioned fixing area of the supporting ring. The welded connection is thus prepared axially offset in relation to the support element.

An axial gap, in which the supporting ring positions the support element, is formed axially between the first substrate body and the second substrate body. According to an advantageous embodiment, an axial dimension of the axial support within the axial gap may be smaller than an axial gap width of the axial gap. It is achieved hereby that the second substrate body is located at an axially spaced location from the axial support, especially from the supporting ring of the axial support. The gap width may be at most 100%, preferably at most 50% greater than the axial dimension of the axial support within the axial gap.

According to another advantageous embodiment, the first substrate body, the axial support and the second substrate body may be inserted into the housing through the same axial opening. This simplifies the canning operation, because, in particular a turning of the housing is eliminated.

An exhaust gas treatment device according to the present invention is characterized in that it is manufactured according to the above-described method. In particular, such an exhaust gas treatment device can be recognized from the fact that there is an axial prestress between the axial support and the respective substrate body even when the exhaust gas treatment device is not used. Further, an exhaust gas treatment device according to the present invention, which contains two or more substrate bodies, can be recognized from the fact that only one of the two axial openings is suitable for inserting the substrate bodies and the axial support.

Further important features and advantages of the present invention appear from the subclaims, from the drawings and from the corresponding description of the figures on the basis of the drawings.

It is obvious that the above-described features, which will also be explained below, can be used not only in the respective combination indicated, but in other combinations or alone as well, without going beyond the scope of the present invention.

Preferred exemplary embodiments of the present invention are shown in the drawings and will be explained in more detail in the following description, where identical reference numbers refer to identical or similar or functionally identical components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
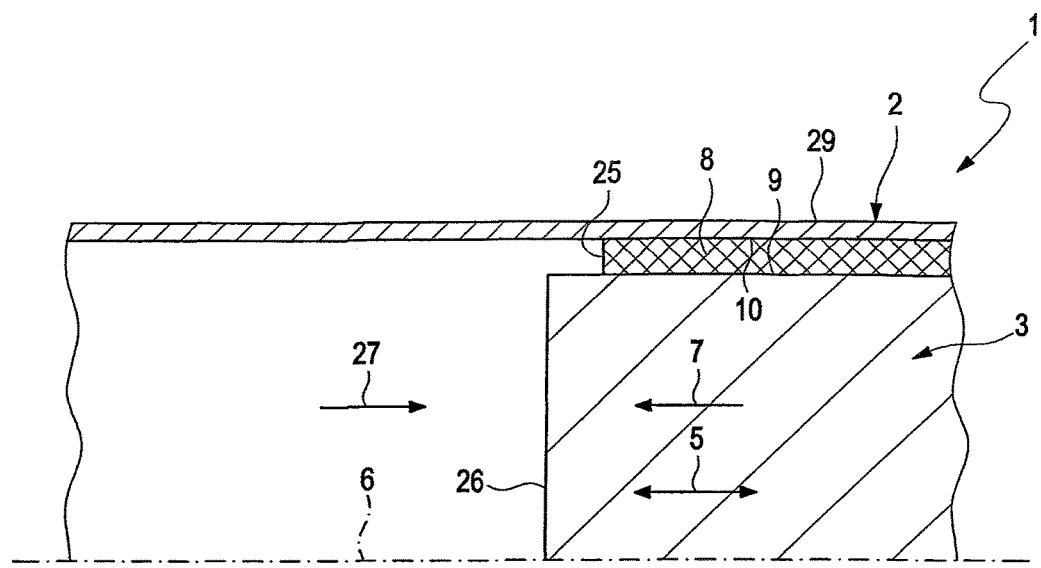
FIG. 1 is a schematic axial sectional view of an exhaust gas treatment device in one of different steps of a manufacturing method.

Referring to the drawings, corresponding to FIGS. 1 through 4, an exhaust gas treatment device 1, which may be, for example, a catalytic converter or a particle filter, comprises a tubular housing 2, in which at least two ceramic substrate bodies, namely, a first substrate body 3 and a second substrate body 4, are arranged. The two substrate bodies 3, 4 are arranged one after another in relation to an axial direction, which is indicated by a double arrow in the figures. The axial direction 5 extends in this case in parallel to a central longitudinal axis 6 of the housing 2. The exhaust gas treatment device 1 is intended for installation in an exhaust system of an internal combustion engine, preferably of a motor vehicle, which exhaust system is not shown here. An exhaust gas flow, which flows through the housing 2 in a direction of flow 7, becomes established in the housing 2 during the operation of the exhaust system. The direction of flow 7 is indicated by an arrow in the figures. With respect to this direction of flow 7, the first substrate body 3 is arranged upstream of the second substrate body 4.

The first substrate body 3 is mounted in the housing 2 by means of a first mounting mat 8, which envelops for this the first substrate body 3 in the circumferential direction and is prestressed or pressed radially between the first substrate body 3 and the housing 2. The first mounting mat 8 may be directly in contact with an outer side 9 of the first substrate body 3 and directly with an inner side 10 of the housing 2. The second substrate body 4 is mounted in the housing 2 with a second mounting mat 11. The second mounting mat 11 envelopes the second substrate body 4 in the circumferential direction and is pressed or prestressed between the second substrate body 4 and the housing 2. The second mounting mat 11 may be directly in contact with an outer side 12 of the substrate body 3 and indirectly with the inner side 10 of the housing 2.

The exhaust gas treatment device 1 contains in the housing 2, in addition, an axial support 13, which has a supporting ring 14 and a ring-shaped support element 15, which is held by or at the supporting ring 14. The axial support 13 is fastened to the housing 2 by means of at least one welded connection 16. The first substrate body 3 is axially supported at the support element 15. During the operation of the exhaust gas treatment device 1, the flow of exhaust gas through the first substrate body 3 can generate shearing forces oriented in the direction of flow 7 because of the flow resistance of the first substrate body 3, which said forces drive the first substrate body 3 relative to the housing 2 in the direction of flow 7. These axial forces can be transmitted now from the first substrate body 3 via the support element 15 to the supporting ring 14 and from this to the housing 2.

Provisions may be made in anther embodiment for the exhaust gas treatment device 1 to contain only a single substrate body 3, 4, which is likewise supported axially at the housing 2 with such an axial support 13. More than two substrate bodies 3, 4 may also be arranged in the housing in another embodiment. Further, it is conceivable to provide more than two axial supports 13 in an embodiment that contains two or more substrate bodies 3, 4 in the housing 2 in order to also support the second substrate body 4, and especially also every additional substrate body, axially at the housing 2.

The supporting ring 14 has an interruption 17 in the circumferential direction, as a result of which the supporting ring 14 has a certain elasticity in the radial direction. Contrary to this, the support element 15 is preferably free from interruptions in the circumferential direction. For example, the support element 15 is formed by a wire mesh.

In a cross section containing the central longitudinal axis 6, the supporting ring 14 has a U-shaped section 18, which has an outer leg 19 located radially on the outside, an inner leg 20 located radially on the inside and a base 21. The base 21 connects the outer leg 19 with the inner leg 20. The outer leg 19 and the inner leg 20 form a radial positioning of the support element 15 at the supporting ring 14. The base 21 forms an axial positioning of the support element 15 at the supporting ring 14. The outer leg 19 projects axially over the inner leg 20 in the embodiment being shown here. As a result, the outer leg 19 forms a fixing area 22 of the supporting ring 13, via which the supporting ring 13 is fastened to the housing 2. In particular, the respective aforementioned weld 16 is formed at or in this fixing area 22. Adjoining the fixing area 22, the rest of the U-shaped 18 forms a holding area 23 of the supporting ring 14, which ultimately holds the support element 15 and fixes same at the supporting ring 14.

The fixing area 22 protrudes axially into a radial gap 24, which is formed radially between the housing 2 and the first substrate body 3. The respective weld 16 is arranged in the area of this radial gap 24. The first mounting mat 8 has an axial edge 25 facing the axial support 13. This edge 25 is arranged axially offset in relation to an axial end face 26 of the first substrate body 3 facing the axial support 13, such that the edge 25 of the first mounting mat 8 axially limits the aforementioned radial gap 24.

Further, the housing 2 is nonperforated especially in the area of the axial support 13. The respective welded connection 16 thus extends through the housing 2 and into the supporting ring 14.

A method for manufacturing the exhaust gas treatment device 1 being described here is characterized by the following steps:

In a first step of the method shown in FIG. 1, the first substrate body 3 is inserted axially into the housing 2 and mounted in the housing 2 by means of the first mounting mat 8. The insertion of the first substrate body 3 is carried out preferably in the insertion direction 27, which is indicated by an arrow in the figures and which is directed opposite the direction of flow 7. The insertion of the first substrate body 3 is carried out such that the first substrate body 3 will subsequently be in a predetermined relative position relative to the housing 2.

Figure 2:
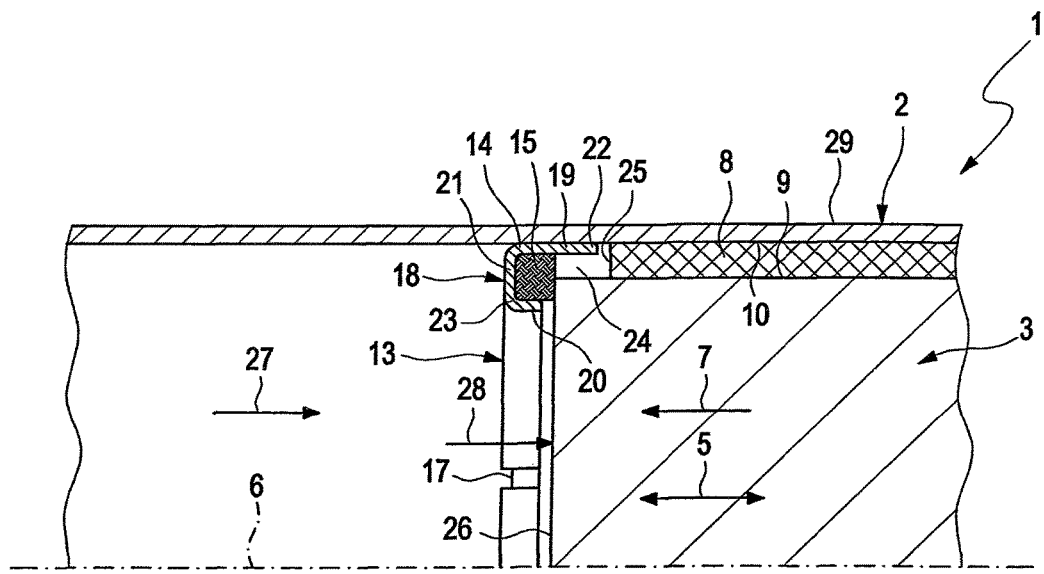
FIG. 2 is a schematic axial sectional view of an exhaust gas treatment device in another of different steps of a manufacturing method.

Corresponding to FIG. 2, the axial support 13 is inserted into the housing 2 in a second step of the method, this insertion being likewise performed in the insertion direction 27. Further, the axial support 13 is positioned axially in the housing 2 such that it transmits a predetermined axial force 28 to the first substrate body 3 via the support element 15. The axial force 28 is indicated by an arrow. The axial support 13 is consequently inserted into the housing 2 at first to the extent that the support element 15 touches the first substrate body 3 on the end face 26 thereof. Further, the axial force 28 is then built up, and the support element 15 is elastically compressed. The axial force 28 is weaker than the axial holding force with which the first mounting mat 8 axially positions the first substrate body 3 in the housing 2.

Figure 3:
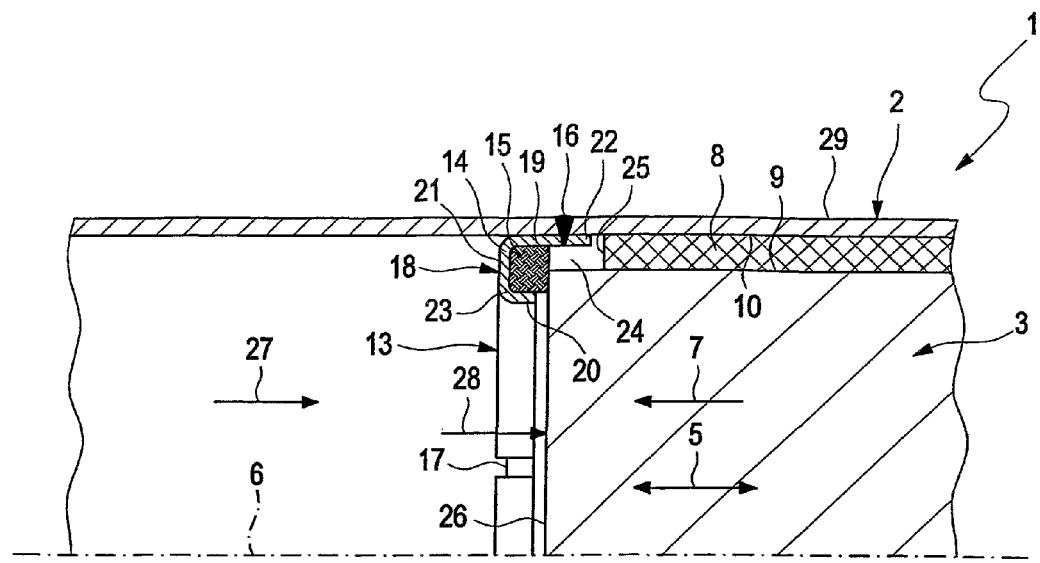
FIG. 3 is a schematic axial sectional view of an exhaust gas treatment device in another of different steps of a manufacturing method.

According to FIG. 3, the axial support 13 is fixed to the housing 2 in a third step of the method, this fixation being carried out in the axially prestressed positioning carried out in the second step. The supporting ring 14 is welded to the housing 2 for this. The at least one welded connection 16 is prepared now. The welded connection 16 is located on the outer leg 19 and in the fixing area 22. At any rate, the welded connection 16 is located in an area of the supporting ring 14 that is located outside the support element 15. The welding for fixing the axial support 13 to the housing 2 is carried out now from an outer side 29 of the housing 2, so that the respective weld 16 is passed through the housing 2. The welding may be carried out according to a laser sweep welding method. The welds 16 are weld seams extending in the circumferential direction in this case, and a plurality of such weld seams are arranged distributed in the circumferential direction and at spaced locations from one another. Such a laser welding method may be carried out through the housing 2, so that the housing 2 may be nonperforated in the area of the welded connection.

Since the supporting ring 14 is preferably fixed to the housing 2 in the pressed-on state under the axial force 28, this axial force 28 is also present after the welded connections 16 have been prepared.

The welding of the supporting ring 14 to the housing 2 may, further, also be carried out such that the supporting ring 14 is pressed radially against the housing 2 prior to the welding and is welded to the housing 2 in this pressed-on state. Due to the interruption 17, the supporting ring 14 has a certain elasticity in the radial direction, as a result of which it can be pressed radially against the housing 2 in an especially simple manner.

Figure 4:
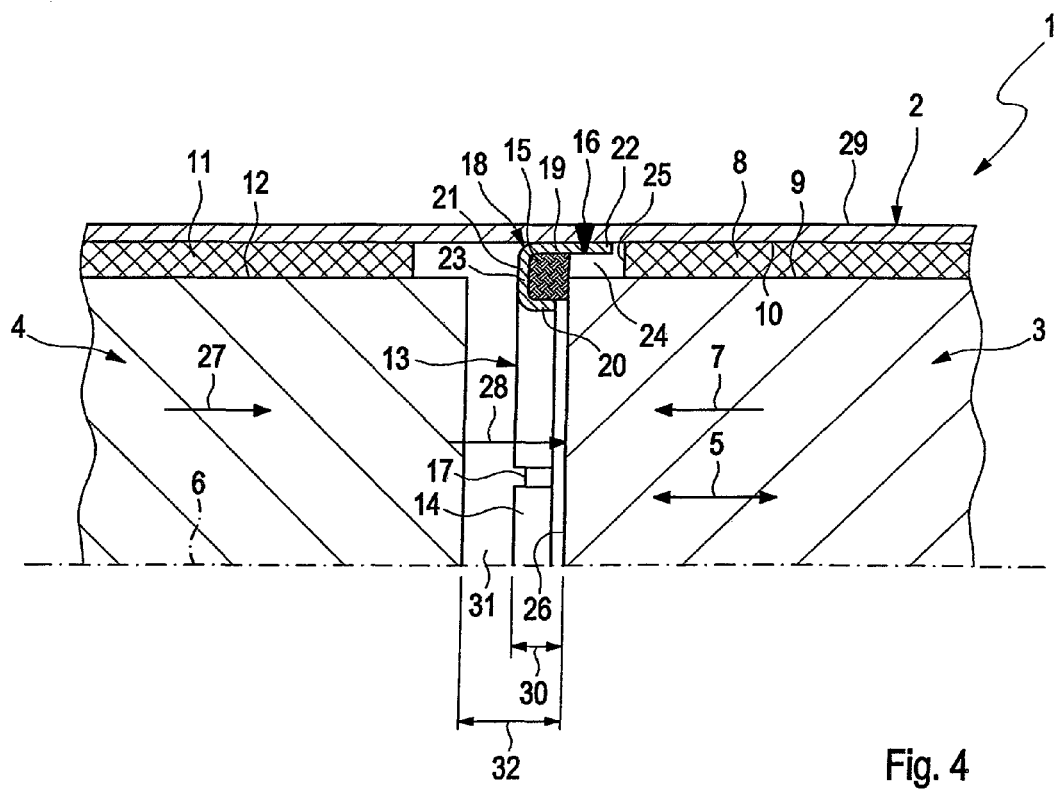
FIG. 4 is a schematic axial sectional view of an exhaust gas treatment device in another of different steps of a manufacturing method.

According to FIG. 4, the second substrate body 4 can now be inserted axially into the housing 2 in a fourth step of the method and mounted therein by means of the second mounting mat 11. The second substrate body 4 is also inserted into the housing 2 in the insertion direction 27. The two substrate bodies 3, 4 and the axial support 13 are correspondingly inserted into the housing 2 through the same axial opening of the housing 2, which opening is not shown here.

As can be determined from FIG. 4, an axial dimension 30 of the axial support 13, which the axial support 13 has within an axial gap 31 formed axially between the two substrate bodies 3, 4, is smaller than an axial gap width 32 of this axial gap 31. The gap width 32 is about 50% greater in the example than the axial dimension 30 of the axial support 13 within the axial gap 31.

While specific embodiments of the invention have been shown and described in detail to illustrate the application of the principles of the invention, it will be understood that the invention may be embodied otherwise without departing from such principles.

What is claimed is:

1. A method for manufacturing an exhaust gas treatment device, which has at least one ceramic substrate body for exhaust gas treatment in a tubular housing, the method comprising the steps of:
    inserting a substrate body axially into the housing;
    mounting the inserted substrate body in the housing by means of a mounting mat, wherein the mounting mat envelopes the substrate body in a circumferential direction and is radially prestressed between the substrate body and the housing;
    providing an axial support, which has a supporting ring and a ring-shaped support element held by the supporting ring;
    inserting the axial support axially into the housing and positioning the axial support in the housing at an axially prestressed position such that the axial support transmits a predetermined axial force to the first substrate body via the support element in the axially prestressed position; and
    fixing the axial support to the housing in the axially prestressed position by welding the supporting ring to the housing.

2. A method in accordance with claim 1, wherein the substrate body is a first substrate body and the mounting mat is a first mounting mat and further comprising the steps of:
    inserting a second substrate body axially into the housing;
    mounting the inserted housing by means of a second mounting mat, wherein the second mounting mat envelopes the second substrate body in the circumferential direction and is radially prestressed between the second substrate body and the housing, and wherein an axial gap, in which the supporting ring positions the first support element, is formed axially between the first substrate body and the second substrate body.

3. A method in accordance with claim 1, wherein the supporting ring is pressed radially against the housing to provide a pressed-on state before welding and the supporting ring is welded to the housing in the pressed-on state.

4. A method in accordance with claim 3, wherein the supporting ring has an interruption in the circumferential direction.

5. A method in accordance with claim 1, wherein:
the supporting ring has a holding area holding the support element and a fixing area providing a welding region for the welding to the housing;
the fixing area is axially inserted, when positioning the axial support in the housing, into an annular gap, which is formed radially between the housing and the substrate body, and is welded in said radial gap to the housing.

6. A method in accordance with claim 5, wherein an axial edge of the mounting mat, facing the axial support, is arranged axially offset in relation to an axial end face of the substrate body, facing the axial support, so that said axial edge axially limits the radial gap, with which the fixing area axially meshes.

7. A method in accordance with claim 1, wherein the welding, for fixing the axial support to the housing, is carried out from an outer side of the housing, radially through the housing.

8. A method in accordance with claim 7, wherein the housing is nonperforated in the area of the axial support and is welded to the supporting ring in a nonperforated state.

9. A method in accordance with claim 1, wherein the welding is carried out as a laser sweep welding.

10. A method in accordance with claim 1, wherein a wire mesh, which is elastically deformed during the axial prestressing of the axial support, is used as the support element.

11. A method in accordance with claim 1, wherein
the supporting ring comprises a U-shaped section comprising an outer leg and an inner leg, for radially positioning the support element, and a base connecting the outer leg with the inner leg for axially positioning the support element; and
the outer leg projects axially over the inner leg and is welded to the housing.

12. A method in accordance with claim 2, wherein:
an axial dimension of the axial support within the axial gap is smaller than an axial gap width of the axial gap;
the gap width is at most 100% and preferably at most 50% greater than the axial dimension of the axial support within the axial gap.

13. A method in accordance with claim 1, wherein the first substrate body, the axial support and the second substrate body are inserted into the housing through the same axial opening of the housing.

14. An exhaust gas treatment device manufactured according to a method comprising the steps of:
providing a ceramic substrate body for exhaust gas treatment;
providing a tubular housing;
inserting the substrate body axially into the housing;
mounting the inserted substrate body in the housing by means of a mounting mat, wherein the mounting mat envelopes the substrate body in a circumferential direction and is radially prestressed between the substrate body and the housing;
providing an axial support, which has a supporting ring and a ring-shaped support element held by the supporting ring;
inserting the axial support axially into the housing and positioning the axial support in the housing at an axially prestressed position such that the axial support transmits a predetermined axial force to the first substrate body via the support element in the axially prestressed position; and
fixing the axial support to the housing in the axially prestressed position by welding the supporting ring to the housing.

15. An exhaust gas treatment device in accordance with claim 14, wherein the substrate body is a first substrate body and the mounting mat is a first mounting mat and further comprising the steps of:
inserting a second substrate body axially into the housing;
mounting the inserted housing by means of a second mounting mat, wherein the second mounting mat envelopes the second substrate body in the circumferential direction and is radially prestressed between the second substrate body and the housing, and wherein an axial gap, in which the supporting ring positions the first support element, is formed axially between the first substrate body and the second substrate body.

16. An exhaust gas treatment device in accordance with claim 14, wherein the supporting ring is pressed radially against the housing to provide a pressed-on state before welding and the supporting ring is welded to the housing in the pressed-on state.

17. An exhaust gas treatment device in accordance with claim 16, wherein the supporting ring has an interruption in the circumferential direction.

18. An exhaust gas treatment device in accordance with claim 14, wherein:
the supporting ring has a holding area holding the support element and a fixing area providing a welding region for the welding to the housing;
the fixing area is axially inserted, when positioning the axial support in the housing, into an annular gap, which is formed radially between the housing and the substrate body, and is welded in said radial gap to the housing.

19. An exhaust gas treatment device in accordance with claim 18, wherein an axial edge of the mounting mat, facing the axial support, is arranged axially offset in relation to an axial end face of the substrate body, facing the axial support, so that said axial edge axially limits the radial gap, with which the fixing area axially engages.

20. An exhaust gas treatment device in accordance with claim 14, wherein the welding, for fixing the axial support to the housing, is carried out from an outer side of the housing, radially through the housing.

* * * * *